United States Patent [19]

Ivins

[11] Patent Number: 4,512,668
[45] Date of Patent: Apr. 23, 1985

[54] THERMOMETER FOR OBTAINING THE TEMPERATURE OF HORSE

[76] Inventor: James M. Ivins, 112 Marengo St., Saint Michaels, Md. 21663

[21] Appl. No.: 446,025

[22] Filed: Dec. 1, 1982

[51] Int. Cl.³ ............................................. G01K 5/00
[52] U.S. Cl. ..................................... 374/194; 374/190
[58] Field of Search .............. 374/194, 190, 201, 208, 374/210, 192; 54/7, 8, 9; D30/21; 119/134

[56] References Cited

U.S. PATENT DOCUMENTS

| | | | |
|---|---|---|---|
| 136,767 | 3/1873 | Rowley | 54/8 |
| 621,625 | 3/1899 | Van Buskirk | 54/9 |
| 660,748 | 10/1900 | Bush | 54/8 |
| 1,549,076 | 8/1925 | Ely | 374/194 |
| 2,271,657 | 2/1942 | Miller | 138/155 |
| 2,283,360 | 5/1942 | Gedge | 374/194 |
| 3,837,142 | 9/1974 | Hill | 54/8 |
| 4,218,917 | 8/1980 | Stortz | 374/194 |

FOREIGN PATENT DOCUMENTS

| | | | |
|---|---|---|---|
| 450888 | 7/1936 | United Kingdom | 374/194 |
| 1184341 | 3/1970 | United Kingdom | 54/8 |

*Primary Examiner*—Charles Frankfort
*Assistant Examiner*—David R. Schuster
*Attorney, Agent, or Firm*—Melvin L. Crane

[57] ABSTRACT

A briddle-bit like device having a temperature determining device with the heat expansible fluid within the bit-like device for obtaining the temperature of a horse. The bit-like device is supported in the horse's mouth by attachment to the halter worn by the horse. The bit-like device is provided with apertures therein for admitting the heat to the heat expansible fluid within the bit-like device. The temperature is determined by a scale such as by any well known thermometer.

7 Claims, 1 Drawing Figure

U.S. Patent   Apr. 23, 1985   4,512,668
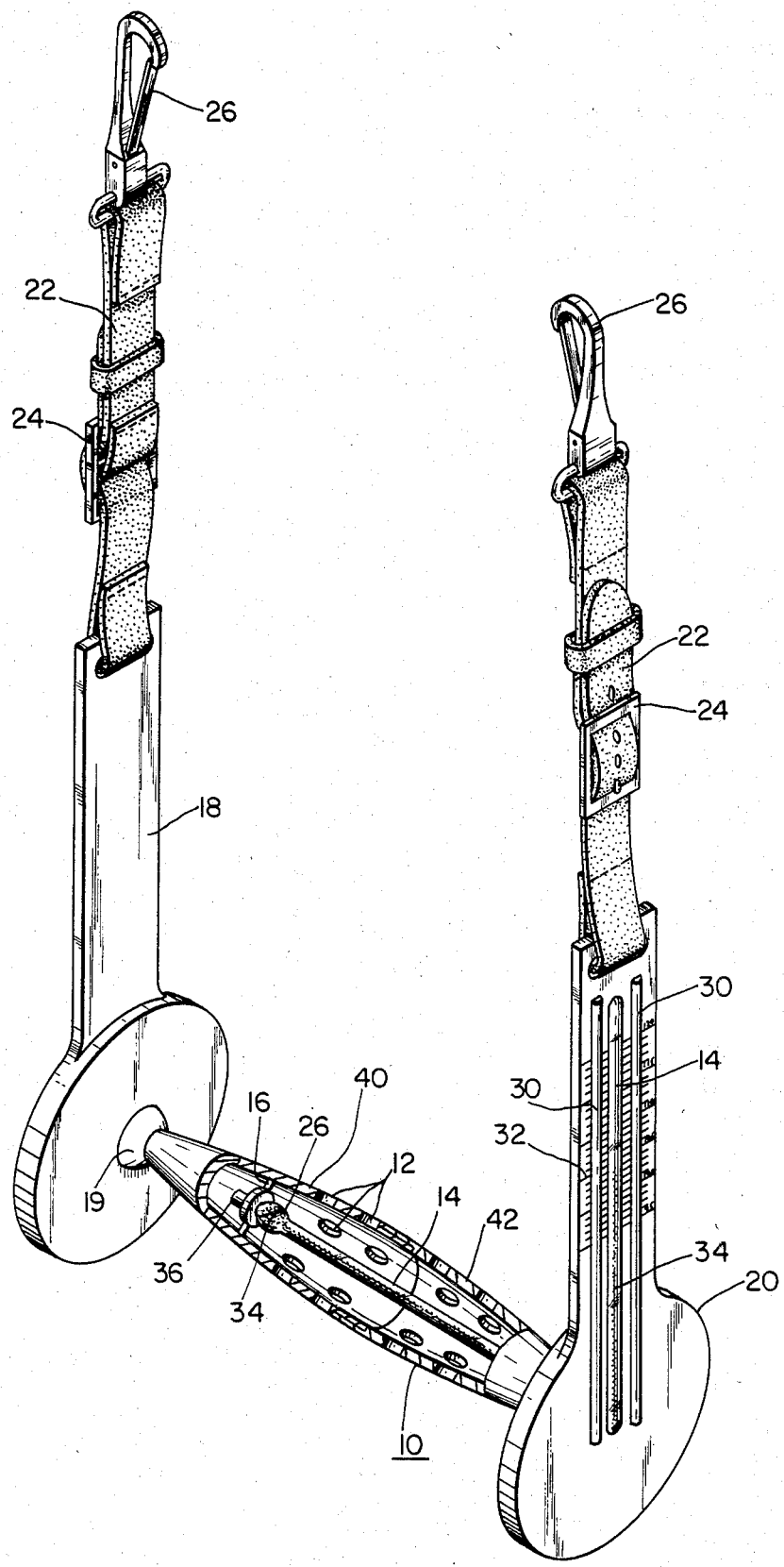

THERMOMETER FOR OBTAINING THE TEMPERATURE OF HORSE

BACKGROUND OF THE INVENTION

This invention related to thermometers and more particularly to a thermometer for obtaining the temperature of a horse or other such animal.

Heretofore, the known method for obtaining the temperature of a horse has been rectally. This creates problems because the thermometer must be held in place for a sufficient time for the temperature to register. Also, it is not the most sanitary area of a horse.

SUMMARY AND OBJECTS

This invention makes use of a thermometer which is adapted to be placed in the mouth of a horse similar to a bit so that it can be secured in place until the thermometer registers the temperature.

It is therefore an object to provide a thermometer by which the temperature of a horse can easily be taken without having to physically hold the thermometer in place.

Another object is to take the temperature of a horse from an end of the horse which is of less danger than the usual end at which the temperature is taken.

Still another object is to provide a thermometer which can be secured in place and left unattended during the time the temperature is registered.

Other objects and advantages will become obvious from the following drawings and description.

BRIEF DESCRIPTION OF THE DRAWING

FIG. 1 is a partial cross-section view in perspective illustrating the relative parts.

DETAILED DESCRIPTION

Now referring to the drawing, there is shown a thermometer for taking the temperature of a horse or other such animal. As shown, the device includes a temperature sensing means formed of a hollow "bridle" bit which is made of a metal of any suitable type such as metals from which bridle bits are made such as steel. The hollow bit is of sufficient length to extend across a horse's mouth and provided with many apertures 12 through the wall thereof through which the heat from the horse's mouth may pass to the temperature sensor 14 which is secured along the axis of the bit. The hollow bit is provided with a support 16 near one end which secures the temperature sensor 14 on the axis of the bit.

The bit is attached at opposite ends to upstanding supports 18 and 20. The support 18 may be hinged to the end of the bit by use of a socket ball-joint at 19 so that the support may be hinged outwardly on one side in order to slide the bit thermometer into the horse's mouth more easily. The support 20 must be rigidly secured to the end of the bit so the temperature determining element may be secured thereto and supported against breakage. Each end of the support have connected thereto an adjustable strap 22 which is provided with an adjusting means such as a buckle 24. The upper end of each of the straps support a snap 26 which connects to a ring on the halter worn by the horse.

The temperature determining means makes use of a well known arrangement for determining temperature. A glass bulb 26 is attached to a glass tube having a small passage. The glass tube extends from the bulb along the axis of the bit to the outside of the bit and support 20 and is bent in a 90° angle so that the glass tube extends along the support 20. The support 20 may be provided with raised rail 30 on opposite sides of the glass tube which function to protect the glass tube. The glass tube is provided with a numbered scale 32 which is etched into the glass, attached thereto, or painted thereon to indicate the temperature. The bulb is filled with an expandable and retractable fluid 34 such as mercury or colored alcohol such as well known in the art. The bulb end of the tube is provided with a solid end extension 36 which fits into the internal bit support 16 for supporting the bulb end of the thermometer element. The mercury or colored alcohol is sealed in the glass bulb/glass tube and rises and falls with changes in temperature to indicate the temperature by use of the number corresponding to the top of the upright column.

In assembly of the temperature determining element, the bit can be made in two separate tubular end pieces 40, 42 so that the glass tube can be slid through one end piece 42 and supported by support 20. Then the other end piece 40 can be joined to piece 42 containing the temperature element so that the bulb end extension of the thermometer slides into the inner support 16 of end piece 40. The two bit ends can be welded together for permanently securing the two pieces together. Alternatively, the bit ends may be made so that the end has a cut down end section that slides into the other end piece with a tight fit. Even with one end sliding into the other these two ends could be secured together by an adhesive or solder to insure that the two bit pieces are held together. Of course, the glass tube is secured to the support 20 to prevent movement of the glass tube relative to the support 20.

In use, the parts are assembled and the bit is placed into the mouth of a horse. The snaps are snapped onto a ring in the halter on each side of the horse's head and the straps are adjusted such that the bit is positioned well into the horse's mouth. Heat from the horse's mouth including body heat of the mouth will heat the metal bit and also flow into the inside of the bit through the apertures or holes 12 in the bit. The heat expandable solution in the bulb-glass tube will be heated and the solution will expand in the glass tube to indicate the temperature of the horse. Since the bulb is within the bit inside of the horse's mouth, the temperature indicated on the scale will be that of the horse.

A thermometer such as set forth above may be easily applied to the horse's mouth so that the temperature is easily obtained. The thermometer-bit may be left in the horse's mouth for as long as it is necessary to obtain the temperature without any attention of the one obtaining the temperature. It has been determined that a horse's normal temperature is about 100 degrees F. and that the horse is considered sick enough for medical attention if the temperature reaches 105 degrees F.

Other arrangements may become obvious to those skilled in the art in light of the above teachings. It is therefore to be understood that within the scop of the appended claims the invention will be practiced otherwise than as specifically described.

What is claimed is:

1. A thermometer for obtaining the temperature of a horse which comprises:
   a hollow tubular bit means having sufficient length to extend across the width of a horse's mouth,
   a support in said hollow tubular bit means,
   a temperature indicating means, said temperature indicating means including a reservoir within said hollow tubular bit means and connected to one end of a glass tube, said reservoir and said glass tube supported within said tubular bit means by said support in said hollow tubular bit means, said support supporting each end of said hollow tubular bit means, a rigid support secured to end of said hollow tubular bit means with said glass tube extending through said rigid support and along said support in said hollow tubular bit means, a heat expansible fluid in said reservoir and a portion of the length of said glass tube, a temperature scale positioned relative to said glass tube and calibrated to indicate temperature of the horse which is indicated at the highest level of said heat expansible fluid in said glass tube.

2. A thermometer as claimed in claim 1, in which:

said support in said hollow tubular bit means and said rigid support include snaps on one end thereof to secure said thermometer to a halter worn by the horse.

3. A thermometer as claimed in claim 2, in which:

said support in said hollow tubular bit means and said rigid support includes an adjustable strap for adjusting the length of said support means and said rigid support.

4. A thermometer as claimed in claim 3, in which:

said rigid support that supports said glass tube for indicating temperature includes protective side rails alongside said glass tube for protecting said glass tube.

5. A thermometer as set forth in claim 2 in which said hollow bit means is made in two pieces which are secured together.

6. A thermometer as set forth in claim 5 in which:

one of said two bit pieces has a cut down end section that slides into one other bit piece with a tight fit by pressing the two bit pieces together.

7. A thermometer as set forth in claim 6 in which said two bit pieces are fuzed together.

* * * * *